Aug. 11, 1959  S. J. DREW ET AL  2,898,823
BOX ASSEMBLY APPARATUS
Filed June 25, 1956  9 Sheets-Sheet 1

INVENTORS.
Stanley J. Drew
BY Charles L. Kanty
F. P. Keiper
ATTORNEY.

Fig-2-

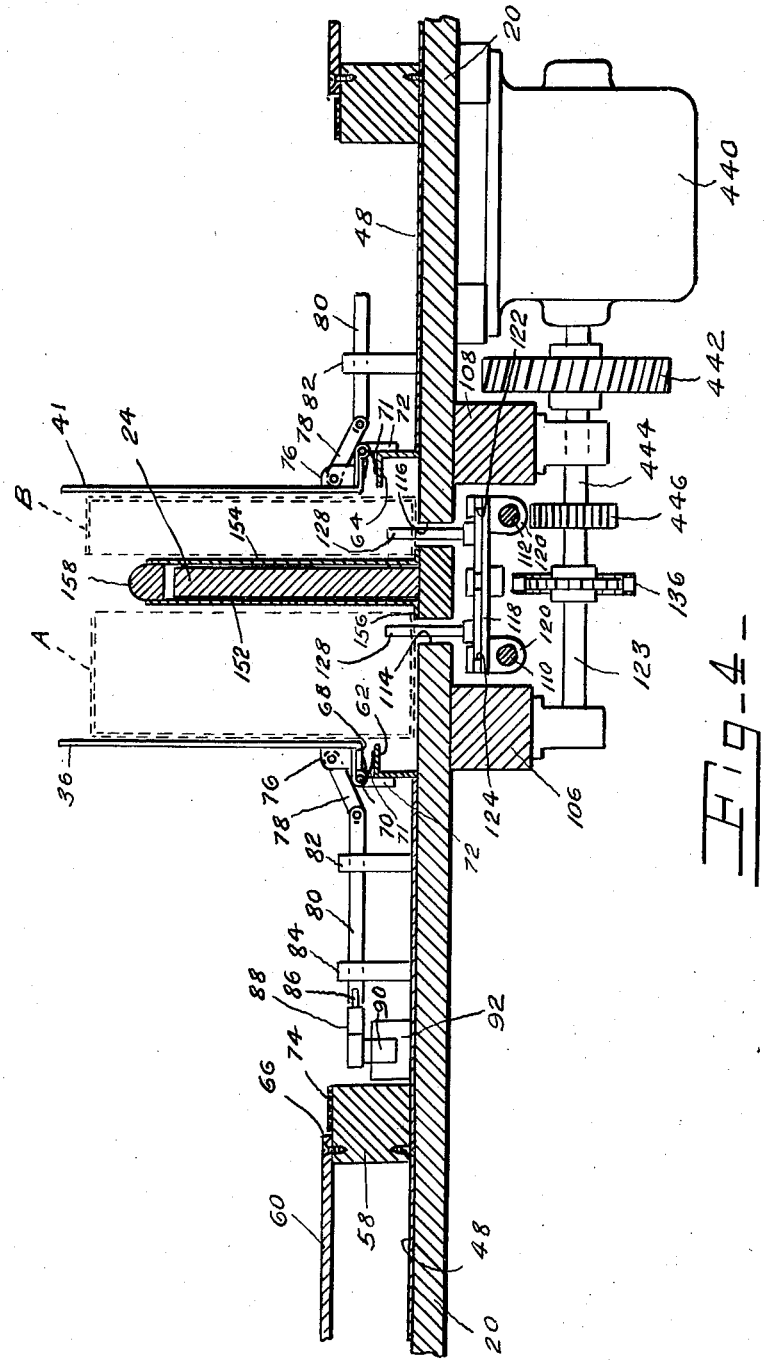

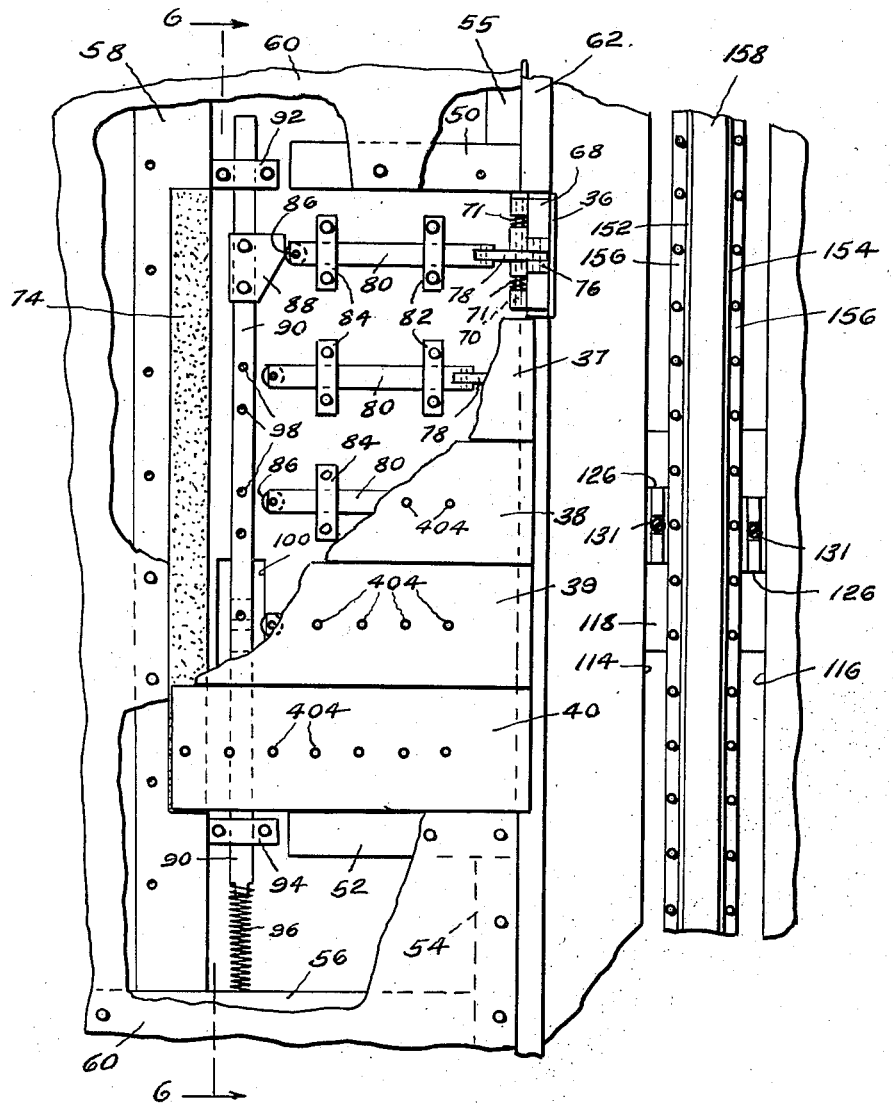

Aug. 11, 1959 S. J. DREW ET AL 2,898,823
BOX ASSEMBLY APPARATUS
Filed June 25, 1956 9 Sheets-Sheet 7
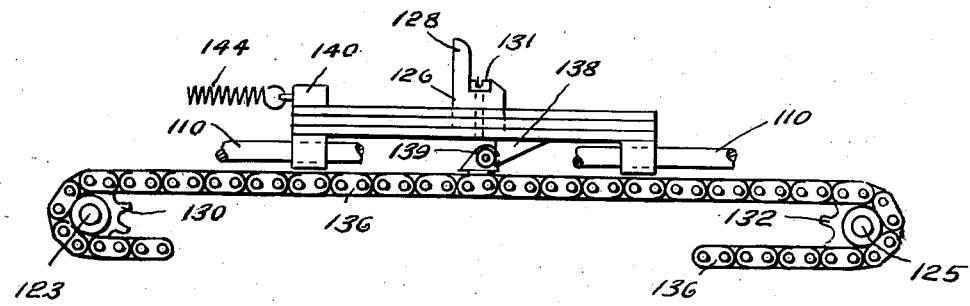
Fig_7_
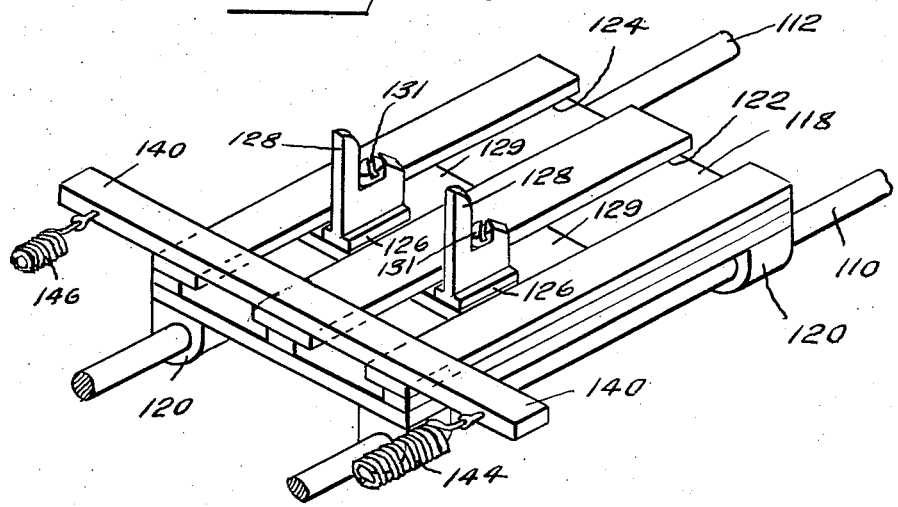
Fig_8_
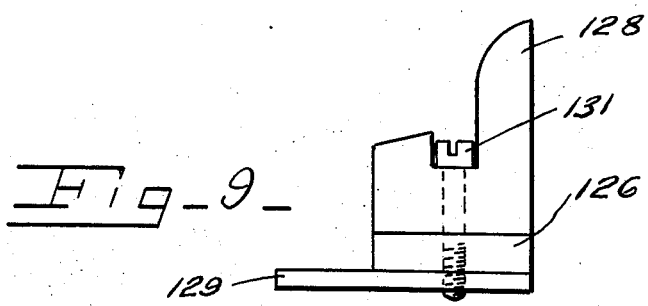
Fig_9_

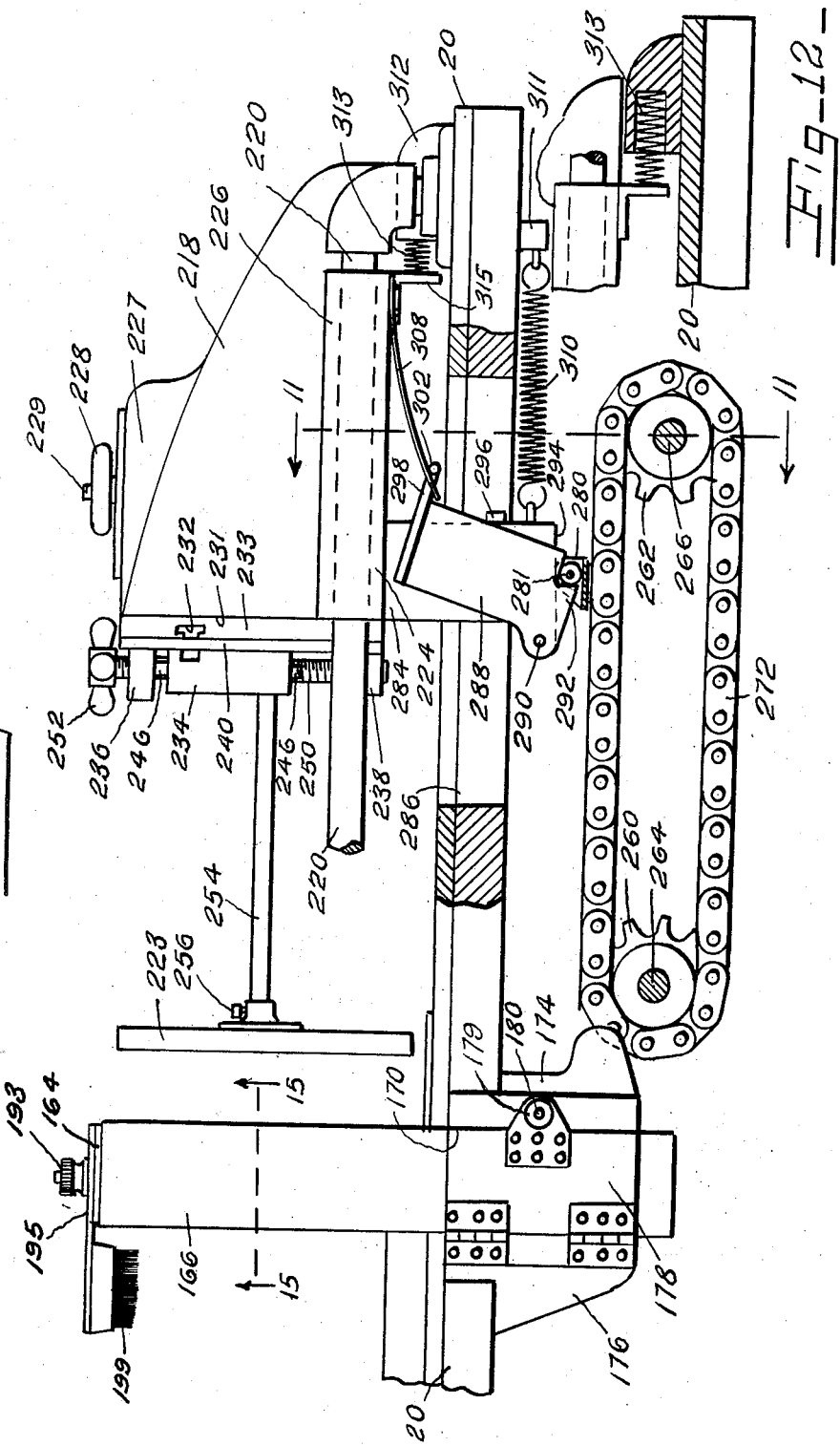

Aug. 11, 1959　　　S. J. DREW ET AL　　　2,898,823
BOX ASSEMBLY APPARATUS
Filed June 25, 1956　　　9 Sheets-Sheet 9
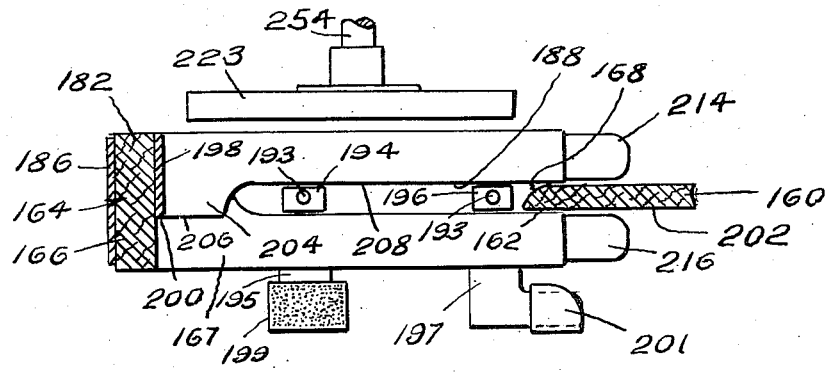
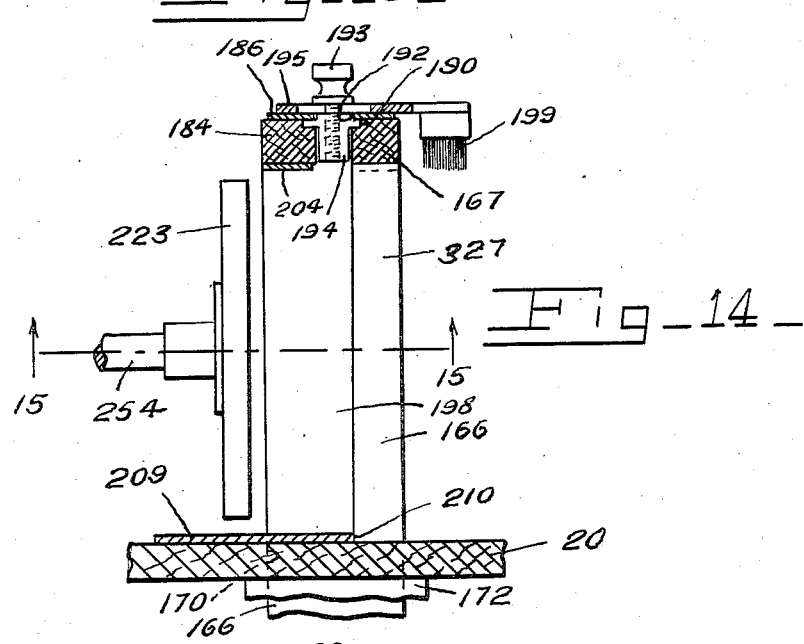
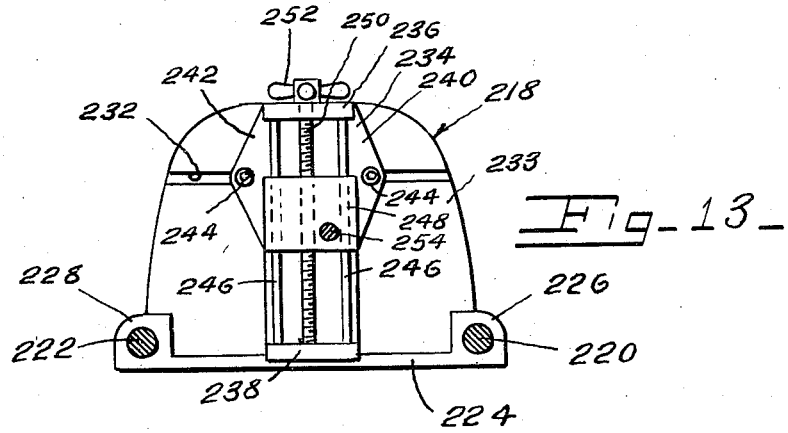

United States Patent Office 2,898,823
Patented Aug. 11, 1959

2,898,823

BOX ASSEMBLY APPARATUS

Stanley J. Drew and Charles L. Kanty, Rochester, N.Y.; said Kanty assignor to said Drew Application June 25, 1956, Serial No. 593,402

19 Claims. (Cl. 93—55.1)

This invention relates to box assembly machines, and more particularly to a machine for assembling set up box bottoms and box tops.

Set up box bottoms and box tops of rectangular configuration after manufacture are usually assembled, that is, the cover or top placed upon the bottom prior to shipment to the ultimate user. Such covers are readily assembled by telescoping the box bottom into the box cover, and it has been the practice to perform such operation by hand. The operation as thus performed, even with the loose fit or clearance between cover and bottom normally provided, is awkward, and slow and tedious, and subjects the box parts to handling and soil.

The present invention is directed to apparatus for receiving a supply of box bottoms and box tops, of the set up type from a conveyor or other supply source, and assembling such bottoms and tops in rapid sequence, and delivering the assembled boxes in stacked formation for bundling or tying in units for shipment. The invention is directed to an apparatus for receiving such bottoms and tops, tipping pairs thereof on edge, in facing relationship and thereafter advancing them to an open frame in which the bottom and top are held in aligned relationship, and thereafter telescopically assembled and ejected from the frame. The invention further has to do with coordinated apparatus for sequentially placing the boxes on edge, advancing them to the assembly position, and thereafter assembling the box parts while delivering an assembled stack from the apparatus. Further, the invention has to do with providing apparatus capable of being quickly adjusted or set to handle a wide variety of box sizes and depths, so that a single machine can be used for handling a wide range of production sizes. The invention further is directed to an apparatus that is capable of high speed assembly, positive in its operation, and which eliminates entirely manual interfitting of the box parts heretofore resorted to.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 4 is a sectional view taken substantially on the line 4—4 of Figure 2;

Figure 5 is an enlarged fragmentary plan view of the box tilt mechanism, with parts broken away;

Figure 7 is a fragmentary side view of the advancing mechanism;

Figure 8 is a perspective view of the advancing mechanism;

Figure 9 is an enlarged side view of an advancing dog or shoulder;

Figure 10 is a side elevational view with parts in section of the assembly mechanism;

Figure 12 is a fragmentary sectional view of the bumper of the assembly mechanism;

Figure 13 is an end view of the assembly mechanism head;

Figure 14 is a transverse sectional view through the open frame taken substantially on the line 14—14 of Figure 2;

Figure 15 is a horizontal sectional view through the open frame end taken substantially on the line 15—15 of Figures 10 and 14, and looking up;

Figure 1:
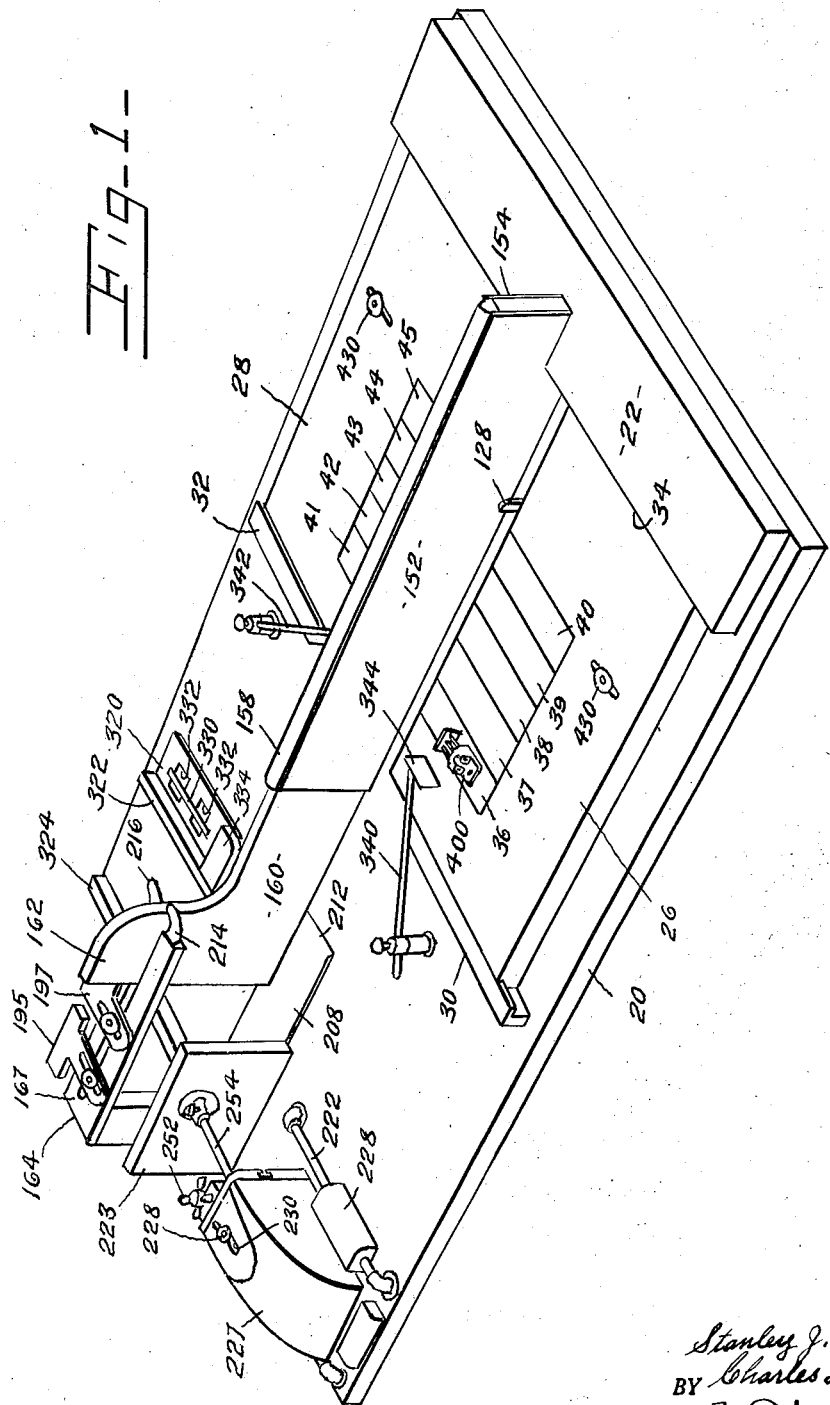
Figure 1 is a perspective view of the box assembly machine.
Figure 2:
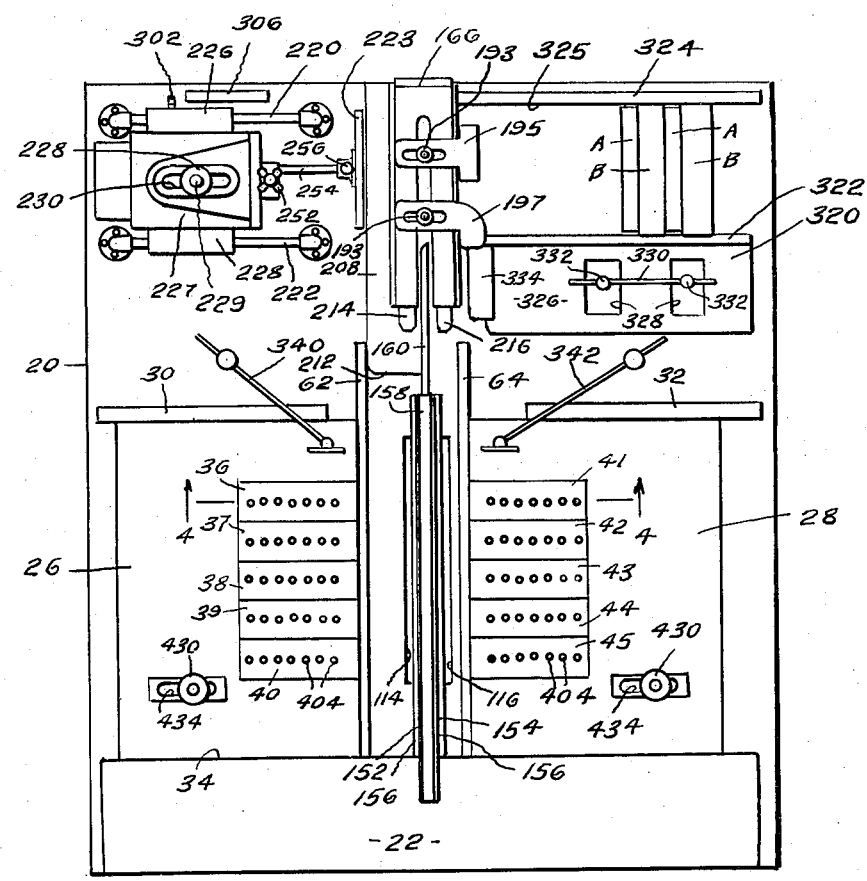
Figure 2 is a top plan view of the machine.

Referring to Figures 1 and 2 there is shown a table 20, a raised platform 22, at the feed in end, a hollow center board or platform 24, and adjustable platforms 26 and 28 flush with the platform or deck 22 and slidable toward or away from the center board, between guides 30 and 32, and the edge 34 of the raised deck 22. The platform 26, is adjustable in relation to the center board to accommodate box bottoms of varying depth, while the platform 28 is adjustable to accommodate box covers of varying depth.

Each of the platforms 26 and 28 have a series of hinged tilt plates 36, 37, 38, 39 and 40, and 41, 42, 43, 44 and 45 respectively on the platforms 26 and 28. Box bottoms, right side up, and oriented with their lengthwise dimension extending in the longitudinal direction of the center board, are fed upon the platform 22 to the left of the center board as shown in Figure 1, and box covers, upside down and similarly oriented are fed across the platform 22 and to the right of the center board. Any suitable conveyor or other means may be used for this purpose. As indicated in Figures 4 and 5, a tilt plate such as 36 is adapted, in timed sequence, to tip box bottoms (see A) up one at a time on their side walls with their open sides facing and against the center board, while a tilt plate such as 41 is adapted to tip box covers (see B) one at a time on their side edges, so that their undersides face the center board. The spacing between the platforms 26 and 28 from the center board are so adjusted as to provide a channel of the width necessary to receive such box bottoms and covers when on edge as set forth, and the box bottoms and covers are thus, when tipped on their side edges, disposed in suitable relation so as to permit insertion of the box bottom into the cover to complete the assembly thereof, when advanced beyond the end of the center board, as will hereafter be referred to.

Each of the platforms 26 and 28 comprises a hollow structure having a bed plate 48, spacer blocks such as 50, 52, 54, 55, 56 and 58, a cover of heavy press board 60, and a series of five tilt plates such as 36—40 as heretofore referred to, for example in conjunction with platform 26. The inside edges of each of the platforms 26 and 28 are provided with angle irons 62 and 64 which extend from the edge 34 of the deck 22 to a point a short distance beyond the guides 30 and 32. The angle iron 62 for example is secured to the spacer blocks 52, 54, 55 and 50.

The cover 60 is provided with a rectangular opening 66 to receive the tilt plates 36—40, which plates, when in the horizontal position shown in Figure 1, have their upper faces flush with the cover 60. Each tilt plate is provided with an end flange 68 disposed perpendicular to the plate proper. Such flange is mounted upon the free pivotal portion of a hinge 70, the fixed portion 72 of which is secured to the angle iron 62 in any suitable fashion. The hinge mount thus provided permits the tilt plate to swing from a horizontal position where its free edge may rest on a felt strip 74 on the member 58, to a vertical position such as is indicated by the plate 36 in Figure 4. A coil spring 71 associated with each hinge, may be used to expedite the return movement of the tilt plate.

Movement of each plate to the vertical position is effected by a cam and link motion. Each tilt plate is provided with a pivot block 76 rigidly affixed thereto, to which is pivotally connected a link 78 extending to a slide bar 80, the latter being slidably mounted in guide posts 82 and 84. The end of the bar 80 is provided with a cam roller 86, and is adapted to engage a cam 88 secured on a transverse cam bar 90, which bar is slidably disposed in guides 92 and 94, mounted upon the bed plate 48. The bar 90 is provided with a compression spring 96 at one end to cause return movement, and the bar is provided with threaded apertures such as 98, so that additional cams 88 may be affixed thereto, either to actuate additional tilt plates in unison, or to actuate a single tilt plate, such as 37, 38, 39 or 40 instead of 36, should it be so desired to operate on any particular box size within the range of adaptability of the apparatus.

Figure 6:
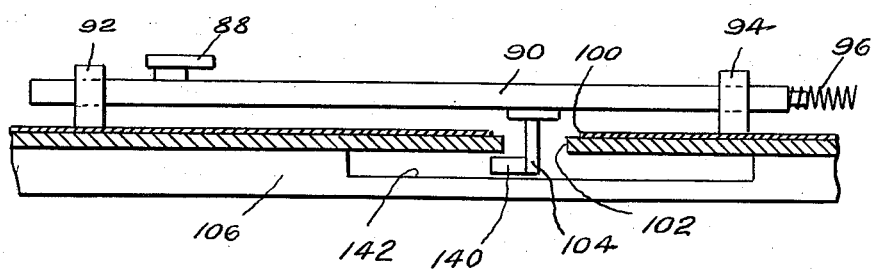
Figure 6 is a fragmentary sectional view taken on the line 6—6 of Figure 5 showing a part of the tilt actuating mechanism.

The bed plate 48 is provided with an aperture 100, and the table 20 is provided with a larger aperture 102, through which depends a rigid arm 104, that projects downwardly perpendicularly from the bar 90 for actuation thereof (see Figure 6).

Beneath the table 20, are provided a pair of spaced parallel cleats 106 and 108 between which extend in parallel relation, a pair of spaced parallel guide rods 110 and 112. On either side of the center board 24, the table 20 is provided with elongated slots 114 and 116. Slidably mounted upon the rods 110 and 112 is a carriage plate 118 having sleeves 120 slidably disposed on the rods 110 and 112. The carriage plate is provided with ways 122 and 124, in which drive shoulder members or dogs 126 may be clamped. Each of such drive shoulders comprises a tongue 128 adapted to project upward through one of the slots 114 and 116 respectively, and a base 129 adapted to be slidably adjusted to a proper position in one or the other of the ways 122 and 124. A vertical set screw 131 extending through the body of the shoulder member 126 is adapted to engage the plate 118, and lock the drive shoulders in any desired position along the ways 122 and 124.

Mounted upon the cleats 106 and 108 are bearings and spaced transverse shafts 123 and 125, which shafts, have affixed centrally thereof sprockets 130 and 132. A chain 136 is looped around the sprockets, and one reach thereof extends parallel with said guide rods 110 and 112, and intermediate thereof, and in close proximity to the carriage plate 118. The carriage plate is provided with a drive block 138 adapted to engage a roller drive member 139 affixed to one link of the chain, through which means the carriage is moved to the in-put end of the table or to the right, as is shown in Figure 7.

The carriage is provided with a transverse cross arm 140, of sufficient length in either direction so as to sweep the range of adjustable positions which may be assumed by the cam bar arms 104 (Figure 6), which depend a sufficient distance to be engaged by the cross arm 140, upon movement of the carriage plate 118. Such cross arm extends through slots such as 142 in the cleats 106 and 108. Movement of the carriage 118 in what may be referred to as the feed direction, is by tension springs 144 and 146, which may extend from the cross arm 140 to points of affixation such as 148 and 150 beneath the table.

With the foregoing description, it will be appreciated that each time the carriage is moved by the chain to the input end of its travel, the cross arm 140, as it approaches the end of travel, engages the arms 104 of the cam bars 90 of each of the platforms 26 and 28, and one or more of the tilt plates, depending upon the placement and number of cams 88 used, are caused to move to a vertical position, as shown in Figure 4. The tilt plates in moving to the vertical position, tip a box bottom, and a box top on their side edges, so that their open sides respectively face one another, and the center board 24. The box top and box bottom drop into the space between the center board and angle irons 62 and 64 when tipped on edge.

When the end of the travel of the carriage is reached, the chain drive member 139 travels around the sprocket 132, and releases the carriage drive block 138 whereupon the carriage is propelled forward by springs 144 and 146, and in such movement the shoulders 126 engage the rear sides of the box bottom and box top and propel the box members forward along the center board. At the same time the cam bars 90 are released, the tilt plates 36 and 41 return to horizontal flush position and are ready to receive the next box bottom and top, following which the drive member 139 reengages the carriage drive block 138, and again returns the carriage to the input end of its travel. When it approaches the end of its travel, the bar 140 actuates such tilt plates to vertical position.

The center board 24 is composed of spaced sheet metal members 152 and 154 having narrow foot flanges 156 for mounting upon the table 20. Such members are provided with a spacer member 158 at the top. Between the members 152 and 154 is a center board extension 160, which may be adjusted lengthwise to accommodate various box lengths. Such center board extension has a forward section of increased height as at 162.

An L frame 164, composed of a vertical leg member 166, and a slotted horizontal section 167 cooperates with the table, and the inclined forward edge 168 of the center board extension to provide an open rectangular frame for receiving a box bottom and top in opposed facing relation in readiness for assembly and lateral ejectment from the apparatus.

The L frame leg 166 is supported in a notch 170 in the forward end of the table 20, which notch is aligned with a guide way 172 depending from the under side of the table. The guide way is braced as at 174 and 176, and the guide way is closed by a hinged door 178, provided with a threaded knob 179 and screw 180, whereby the door acts as a clamp to hold the leg 166 in any adjusted vertical position. The L frame may be composed of plywood members 182 and 184 reinforced exteriorly by a heavy steel strap 186, having a right bend to conform to the L shape. The member 184 is slotted as at 188 to receive the forward end 162 of the center board extension 160 and the upper edges of the slot are rabbetted as at 190 and cooperate with a slot 192 in the strap 186 to provide a space to receive clamp blocks such as 194 and 196, which have lateral shoulders extending into the rabbetted recesses beneath the strap 186. Such blocks are used to affix brackets 195 and 197 which are provided with guide means such as a bristle brush 199, or curved guide member 201, clamp screws 193 being employed to hold the brackets in position.

The inside surface of the leg 166 of the L frame is provided with a plate 198 the forward edge 200 of which extends to the plane of the surface 202 of the center board extension 160 and the under surface of the slotted member 184 is provided with a similar plate 204, whose forward edge 206, likewise extends to the plane of the center board extension surface 202. Such plate however is relieved as at 208 to clear the slot 188. The thickness of the plates 204 and 198 is the thickness of the box cover skirt plus the clearance allowance for receiving the box bottom.

On the table and beneath the L frame is a plate 209, the edge 210 of which lies in the plane of the center board extension surface 202. Such plate is of a thickness similar to plates 204 and 198. The edge 212 of such plate is inclined so as to end flush with the table surface so as to avoid interfering with the feed of boxes along the center board into the L frame.

Beyond the end of the frame section 167, and clamped between the member 184 and the strap 186 are spaced resilient tongues 214 and 216 on either side of the slot 188. Such tongues are suitably curved so as to receive and guide box bottoms and covers down under the frame as they approach the frame member 184 for subsequent positioning within the frame.

In order to propel a box bottom A, when positioned in the frame with its forward end side against the plate 198, into a box cover B held in position in the other side of the frame just beyond the edges 206, 200 and 212 of the plates 204, 198 and 208, there is provided a box assembly and ejector head. Such head comprises a carriage 218 slidable on spaced parallel bars 220 and 222, the carriage having mounted thereon an ejector plate 223 of suitable rectangular shape and so disposed as to conform closely to the bottom wall of a box bottom. The reciprocation of the carriage 218, in timed sequence with the arrival of a box bottom and cover in the L frame, effects telescopic assembly of the box and its cover, and ejectment of the assembled box to a position clear of the path of the succeeding box bottom and box cover to be fed into the frame.

Such head comprises a bed plate or saddle 224, having integral side sleeves 226 and 228, slidable on the fixed bars 220 and 222, which bars extend at right angles to the center board 24. The head proper 227 is slidable on the saddle and held in any adjusted position by the threaded knob 228, threaded on an upstanding stud 229 extending from the saddle up through the slot 230.

The forward face 231 of the head is provided with a plate 233 having a transverse key slot 232, by means of which is clamped an adjustable slide block assembly composed of a frame 234 having end blocks 236 and 238, and side flanges 240 and 242 for clamping as by bolts 244 the heads of which ride in the slot 232. Parallel bars 246 extend between the end blocks 236 and 238. Slidably mounted on said bars is a block 248. Such block may be moved up or down by the threaded screw member 250 journalled in the end blocks 236 and 238, the member being received in an internally threaded bore in said block 248. A suitable handle 252 facilitates vertical adjustment. Lateral adjustment of the slide block assembly is had by means of its location along the key slot 232. The block 248 is provided with a projecting bar 254 adapted to support the ejecting plate 223, by any suitable clamp such as 256.

Figure 3:
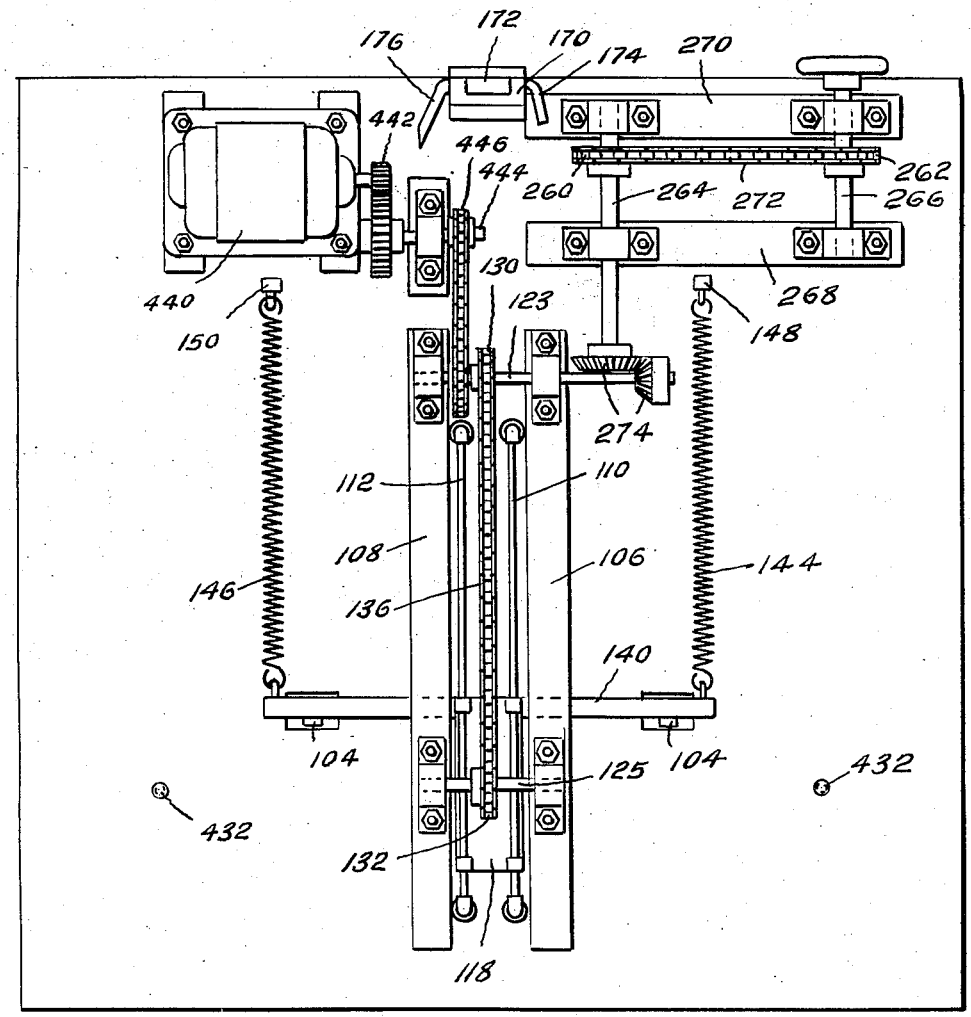
Figure 3 is a bottom plan view of the machine.

Reciprocating movement of the head is effected by a chain and sprocket drive beneath the table. For this purpose, spaced sprockets 260 and 262 are mounted on shafts 264 and 266 journalled in bearings in cleats 268 and 270, and an endless chain 272 is provided. The shaft 264 is driven from the shaft 126 by bevel gears 274 (see Figure 3). In practice the ratio of such gears may be 2 to 1, and when such ratio is employed, with sprockets 260 and 262, and 130 and 132 all of the same size, coordination of the movements is had, provided the overall length of the chain 272 and the overall length of chain 136 are in the ratio of 1 to 2.

Figure 11:
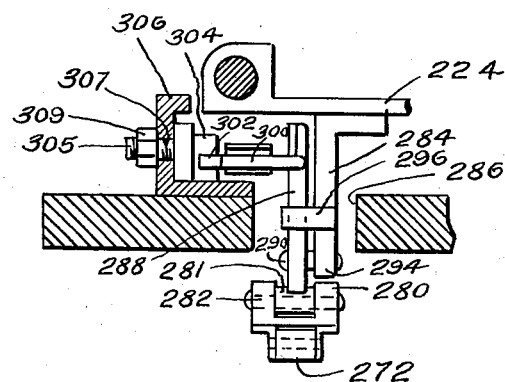
Figure 11 is a fragmentary sectional view through the assembly mechanism taken substantially on the line 11—11 of Figure 10.

The chain 272 is provided with a roller abutment, mounted on one of the links thereof, said roller abutment comprising spaced trunnion bearings 280 and 282 with an intervening roller 281 (see Figure 11). Depending from the underside of the saddle 224 is a plate 284 which projects through a slot 286 in the table. Pivotally mounted at the forward lower end of such plate is a pivotal dog 288, pivoted as at 290, which dog is provided with a tooth 292 adapted to project below the lower edge 294 of the plate 284, when in the position to engage the chain roller 281. A stop 296 on the plate 284 limits the movement of the dog in one direction. The upper end of the pivotal dog is provided with a trailing extension 298 from which extends laterally above the table, an arm 300. The end of such arm is provided with a roller 302 adapted to engage a cam 304 adjustably positioned within a slotted channel guide 306. See Figures 2 and 11. By adjusting the cam to the desired position along the length of the channel, the pivotal dog can be rotated counterclockwise to release the chain roller when the roller 302 rides up on the cam 304, following which return movement of the head and carriage may take place. A leaf spring 308 on the under side of the saddle bears against the arm 300. Any suitable return spring such as 310 below the table may serve to return the head, such spring being tensioned between the plate 284 and a fixed point 311. A bumper 312 with springs 313 recessed therein may be provided to absorb any shock on return movement of the head, such springs engaging a depending end flange, 315 on the head. Positive release is afforded by reason of the roller trunnion 282 bearing upwardly against the lower edge 294 of the plate 284, when release movement of the dog 288 by the cam 304 is effected. Thus the chain cannot be displaced upwardly, when the tooth 292 is lifted, and precision release at a set point of advance is effected.

The cam 304 is provided with a stud 305 extending through a lengthwise slot 307 in the channel 306, so that the cam can be moved to any selected position by loosening the nut 309, after which the cam may be locked in place by tightening the nut.

On the table 20 is positioned an adjustable guide 320 having an upstanding guide flange 322, which may be positioned in spaced relation from the side flange 324, in accordance with the length of the assembled boxes, as indicated at AB, in Figure 2. The inside face 325 of said flange 324 will be in alignment with the face 327 of the vertical frame member 166. Such guide 320 has a base plate 326 with large windows 328, and can be affixed to the table top in any selected position by a cleat 330, the latter being clamped in place by screws 332 extending through the windows 328 into the table. Such guide may also have a flange 334 which may be placed substantially in alignment with the inside edge of the angle iron 64, to guide the box covers as they are advanced into the open frame. The guide 320 is locatable on the table as desired to suit the length and depth of box covers being accommodated.

As box bottoms and box tops are fed onto the platforms 26 and 28, they are, pair by pair, tilted on their side edges following which the dogs or shoulders 126 move the pair forward toward the assembly frame. Adjustable stops 340 and 342 are provided to roughly locate the position a box bottom and box top may assume prior to tilting on edge. The adjustment of the plates 344 and 346 of such stops will be such as to locate the plate 344 at a distance from the plate surface 198 of the vertical frame member 166 to accommodate the number of box bottoms on edge located in the frame, and in position for advancement into the frame. Thus the distance will be a multiple of the length of the box bottom, plus sufficient clearance.

The location of the plate 346 will be similarly set, for box covers, which have a length slightly greater than the box bottoms. Consequently, the plate 346 will be located a little further from the frame member 166 than the plate 344. Also the dog 126 for feeding box bottoms will be located on the plate 118 a little nearer the assembly end of the table than the dog 126 for feeding box tops, the difference being determined by the number of box bottoms and corresponding tops which will be positioned on edge awaiting assembly in the frame, at the time a box bottom, and box top are about to be tilted on edge towards the center board, and the difference in the lengthwise dimension of a box bottom and box top. Thus, if three box bottoms and box tops are normally disposed in alignment on edge awaiting successive assembly, the box bottom dog 126, will be closer to the assembly end than the box top dog 126, by three times the difference between the lengthwise dimension of the box bottom and box top, less the thickness of the plate 200, since such plate allows the forward end of the end box top awaiting assembly to be positioned slightly ahead of the forward end of the corresponding box bottom, in order that the bottom and top will be in proper alignment and position for telescopic assembly.

Figure 16:
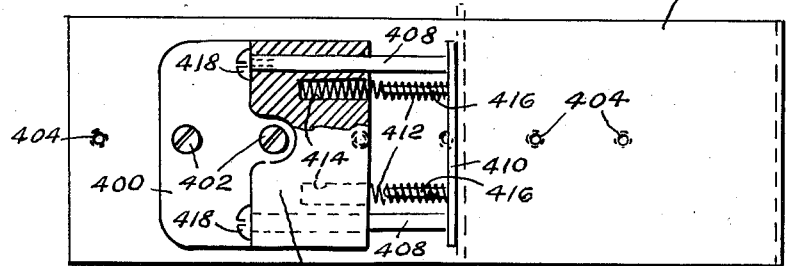
Figure 16 is a fragmentary top view, with parts broken away of a tilt plate guide.
Figure 17:
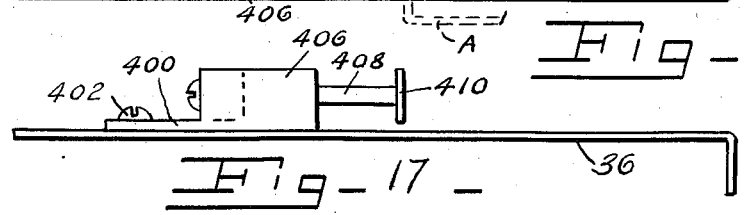
Figure 17 is a side view of the guide of Figure 16.

In order to assure that a box bottom, or box top resting on a tilt plate will be positively tilted into the respective channels defined by the respective angle irons 62 and 64 and the center board 24, yielding abutments as shown in Figures 16 and 17 may be affixed to one or more of the tilt plates such as are rendered active by such cams 88 as are in use. The abutments comprise a member 400 which may be affixed to the plate at any one of a plurality of positions by the screws 402, such screws being threaded in any selected adjacent pair of threaded apertures 404. The member 400 is provided with a block-like portion 406 in which is slidably disposed a pair of guide rods 408 to which is affixed a transverse plate 410. Such plate is urged to the position shown in Figure 16 by springs 412 extending into recesses 414, and threaded on guide pins 416. The ends of the rods 408 are provided with screws 418, the heads of which limit the end movement of the plate 410. The plate 410 may yieldingly engage the side edge of a box bottom (or top) during the tilting movement, assuring that such box member will not fail to be tilted upward and be thus properly positioned in the channel formed between the angle iron 62 (or 64) and the center board 24. The spacing between the apertures 404, is preferably less than the extent of movement of the plate 410.

From the description, it will be seen that a highly flexible assembly apparatus is provided. The platforms 26 and 28 may be adjusted for a wide range of box bottom and box top heights (or depths) and the platforms when properly adjusted are clamped in position by the clamp knobs 430, which are threaded on bolts 432 extending upwardly from the table, and through slots 434 in the platforms. The particular tilt plate or plates to be used may be selected in accordance with the position the box bottom and top will take, when ready for tilting on end, taking into account the space taken by the number of box pairs already on end and awaiting sequential assembly. Again the L frame 164 may be raised or lowered depending on the width of the box members, and the center board extension 160 will be adjusted to provide the proper lengthwise opening corresponding to the length of a box bottom. Various size ejector plates 223 may be kept on hand, and a proper size selected and adjusted vertically and horizontally for alignment with the bottom wall of a box bottom awaiting telescopic assembly.

In addition, the travel of the box assembly head may be set by adjustment of the cam 304 along the length of the channel 306, so that each assembled box will be ejected sufficiently beyond the frame to provide clearance for the oncoming next box cover, and the head can be adjusted on the saddle 214.

The brush 199, will be adjusted so that its bristles will contact the upper side of the box cover and hold the cover while the bottom is being telescopically inserted, and thereafter permit the assembled box to be driven clear of the path of the next box cover. The guide 201 is located below the supporting arm 197 so as to engage the outside cover surface of a box cover a slight distance below its upper edge, so that such cover will be properly guided into position in the frame. The guide 201 holds the second box cover against lateral movement, along with the flange 331, when the box undergoing assembly is ejected from the frame.

The entire apparatus may be driven by a single motor 440, driving through a reduction gear 442 to a jack shaft 444 and a belt drive 446 to the shaft 123.

It will be seen that the boxes ejected in assembled relation are in effect stacked horizontally, and a chute (not shown) may extend beyond the table to receive a long stack of such boxes. From such stack units of assembled boxes may be removed and tied or otherwise bundled for shipment.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A box bottom and cover assembling machine comprising a work table, a central partition extending part way there along, means for moving a box bottom and box cover into engagement with said partition with their open faces toward the partition, means for moving a box bottom and cover along said partition and to positions in alignment for assembly and beyond the end of the partition, guide frame means adapted to receive and having portions complemental to a box cover and box bottom located beyond said partition and means for relatively moving a box bottom located beyond the end of the partition in said frame guide means into telescopic assembled relation with a box cover.

2. A box bottom and cover assembling machine comprising a work table, a central partition extending part way there along, means for moving a box bottom and box cover into engagement with said partition with their open faces toward the partition, means for moving a box bottom and cover along said partition and to positions in alignment for assembly and beyond the end of the partition, guide frame means adapted to receive and having portions complemental to a box cover and box bottom located beyond said partition and means for moving a box bottom located beyond the end of the partition in said frame guide means into telescopic assembled relation with a box cover, and ejecting the assembled box bottom and cover beyond the plane of said partition, a distance at least as great as the depth of said cover.

3. A box bottom and cover assembly machine comprising a work table, a central partition extending part way there along, an open sided frame lying substantially in the plane of said partition, and having its open side closed by the end of said partition, means for feeding a box bottom and cover with their open sides facing said partition along said partition on opposite sides thereof and into said frame, and means for moving the box bottom through said frame into telescopic assembled relation with said cover.

4. A box bottom and cover assembly machine comprising a work table, a central partition extending part way in the plane of said partition, an open side frame lying substantially in the plane of said partition, and having its open side closed by the end of said partition, said open sided frame being formed on one side by said table, and said frame having inside stepped surfaces on opposite sides of the plane of said partition, the surfaces on the box bottom side defining a frame to receive an end and the side walls of a box bottom, and the surfaces on the box cover side defining a frame to receive an end and the side walls of a box cover in aligned relation to the box bottom and in position for telescopic assembly thereof, means for feeding a box bottom and cover with their open sides facing said partition along said partition on opposite sides thereof and into said frame, and means for moving the box bottom through said frame into telescopic assembled relation with said cover.

5. A box bottom and cover assembly machine comprising a work table, a central partition extending part way there along, an open sided frame lying substantially in the plane of said partition, and having its open side closed by the end of said partition, said open sided frame being formed on one side by said table, and having a member extending parallel thereto in spaced relation above said table, said member having a slot to receive the end of said partition, and said frame having inside stepped surfaces on opposite sides of the plane of said partition, means for varying the spacing between said member and table, means for varying the spacing between the partition and the closed side of said frame, means for feeding a box bottom and cover with their open sides facing said partition along said partition on opposite sides thereof and into said frame, and means for moving the box bottom through said frame into telescopic assembled relation with said cover.

6. A box bottom and cover assembly machine comprising a work table, a central partition extending part way there along, an open sided frame lying substantially in the plane of said partition, and having its open side closed by the end of said partition, said open sided frame being formed on one side by said table, and having a member extending parallel thereto in spaced relation above said table, said member having a slot to receive the end of said partition, means for varying the spacing between said member and table, means for varying the spacing between the partition end and the closed side of said frame, said frame having inside stepped surfaces on opposite sides of the plane of said partition to receive in telescopic alignment an end and the sides of a box bottom and cover, means for feeding a box bottom and cover with their open sides facing said partition along said partition on opposite sides thereof and into said frame, and means for moving the box bottom through said frame into telescopic assembled relation with said cover.

7. A box bottom and cover assembly machine comprising a work table, a central partition extending part way there along, an open sided frame lying substantially in the plane of said partition, and having its open side closed by the end of said partition, means for feeding a box bottom and cover with their open sides facing said partition along said partition on opposite sides thereof and into said frame, means slidably mounted on guides for moving the box bottom through said frame into telescopic assembled relation with said cover, and means for limiting the movement of said slidably mounted means.

8. A box bottom and cover assembly machine comprising a work table, a central partition extending part way there along, an open sided frame lying substantially in the plane of said partition, and having its open side closed by the end of said partition, said open sided frame being formed on one side by said table, and said frame having inside stepped surfaces on opposite sides of the plane of said partition, the surfaces on the box bottom side defining a frame to receive an end and the side walls of a box bottom, and the surfaces on the box cover side defining a frame to receive an end and the side walls of a box cover in aligned relation to the box bottom and in position for telescopic assembly thereof, means for feeding a box bottom and cover with their open sides facing said partition along said partition on opposite sides thereof and into said frame, means for moving the box bottom through said frame into telescopic assembled relation with said cover, and means for limiting the movement of said moving means.

9. A box bottom and cover assembly machine comprising a work table, a central partition extending part way there along, an open sided frame lying substantially in the plane of said partition, and having its open side closed by the end of said partition, said open sided frame being formed on one side by said table, and having a member extending parallel thereto in spaced relation above said table, said member having a slot to receive the end of said partition, means for varying the spacing between said member and table, means for varying the spacing between the partition end and the closed side of said frame, said frame having inside stepped surfaces on opposite sides of the plane of said partition to receive in telescopic alignment an end and the sides of a box bottom and cover, means for feeding a box bottom and cover with their open sides facing said partition along said partition on opposite sides thereof and into said frame, means for moving the box bottom through said frame into telescopic assembled relation with said cover, and means for alternately actuating said feeding means and said moving means.

10. A box assembly machine comprising a table, a center partition extending part way along the length of the table, raised platforms disposed on said table on opposite sides of said partition for receiving box bottoms right side up on one side of the partition, and box tops upside down on the other side of the partition, means for spacing said platforms from said partition to provide a lengthwise groove along the partition on each side thereof commensurate with the depth of a box bottom on the one side, and the depth of a box top on the other, means associated with each of said platforms for tilting box bottoms and tops on edge into said grooves, in open facing relation to each other on opposite sides of said partition, and means associated with said table for simultaneously moving a box bottom and top lengthwise in their respective grooves toward the end of the partition, an open sided rectangular frame vertically disposed in respect to said table located substantially beyond the end of said partition with the open side facing towards said partition to receive simultaneously pairs of box bottoms and tops in sequence, said frame having means for receiving a box bottom and top in aligned relationship for assembly, and means for projecting one of said box members toward the other to telescopically engage the bottom and top of a pair, and project the closed box assembly laterally beyond the plane of the partition.

11. In a box bottom and cover assembling machine, a work table, a central partition extending there along, platforms on either side of said partition and spaced therefrom to form a channel to receive box members on their side edges, hinged plate members mounted on said platform along the edge thereof adjacent said partition and adapted to move from a position flush with said platform to a vertical position lying substantially in a plane parallel with the plane of said partition to tip box members into said channel, a slot in said table extending along said partition, reciprocating box member feed means movable lengthwise of said partition and projecting through said slot, and means responsive to movement of said feed means in one direction for tilting said plate members to a vertical position.

12. In a box bottom and cover assembling machine, a work table, a central partition extending there along, means on either side of said partition for tipping box bottoms and box tops up on their side edges for facing relation on opposite sides of said partition for subsequent telescopic assembly, and means for subsequently moving along said partition a box bottom and box top so disposed on their side edges.

13. In a box bottom and cover assembling machine, a work table, a central partition extending there along, means on either side of said partition for tipping box bottoms and box tops up on their side edges in facing relation on opposite sides of said partition for subsequent telescopic assembly, and reciprocating means movable lengthwise of said partition for subsequently moving along said partition a box bottom and box top so disposed on their side edges.

14. In a box bottom and cover assembling machine, a work table, a central partition extending there along, means on either side of said partition for tipping box bottoms and box tops up on their side edge in facing relation on opposite sides of said partition for subsequent telescopic assembly, reciprocating means movable lengthwise of said partition for subsequently moving along said partition a box bottom and box top so disposed on their side edges on a forward stroke thereof, and means operable by said reciprocating means on a return stroke thereof for actuating said tipping means.

15. In a box bottom and cover assembling machine, an open sided frame, means for feeding box covers and box tops into said frame from the open side thereof in facing relation and in alignment for telescopic assembly, and reciprocating means disposed laterally of said frame and movable normal of the plane of said frame, said means having an ejecting member movable through said frame to telescope a box bottom within a box top located within said frame.

16. In a box bottom and cover assembling machine, an open sided frame, means for feeding box covers and box tops into said frame from the open side thereof in facing relation and in alignment for telescopic assembly, reciprocating means disposed laterally of said frame and movable normal of the plane of said frame, said means having an ejecting member movable through said frame to telescope a box bottom within a box top located within said frame, and means for determining the length of the assembly stroke of said reciprocating means.

17. In a box bottom and cover assembly machine, an open sided frame, means for feeding box bottoms and box tops into said frame from the open side thereof in facing relation and in alignment for telescopic assembly, reciprocating means disposed laterally of said frame and movable normal of the plane of said frame, said means having an ejecting member movable through said frame to telescope a box bottom within a box top located within said frame, and eject an assembled box bottom and top from said frame, said means comprising a head slidably mounted on guide rods, an endless driving chain having a reach thereof extending parallel to the line of movement of the head, an abutment on said chain, a release dog carried by said head adapted to extend into the path of movement of said abutment, and relatively stationary cam means for actuating said dog to release the dog from the chain abutment after a predetermined movement of said head.

18. A box bottom and cover assembling machine comprising a work table, a central partition extending part way there along, means for moving a box bottom and box cover into engagement with said partition with their open faces toward the partition, means for moving a box bottom and cover along said partition and to positions in alignment for assembly and beyond the end of the partition, means for holding a box bottom and box top in spaced parallel and aligned relation beyond the partition, and means for relatively moving a box bottom and box cover held by said means beyond the end of the partition into telescopic assembled relation.

19. In a box bottom and cover assembling machine, a work table, a central partition extending therealong, means on either side of said partition for positioning box bottoms and box tops on their side edges on said work table in facing relation on opposite sides of said partition and oriented so that the side walls of the box bottoms and the side walls of the box tops are parallel to each other, and means for moving a box bottom and box top on said work table so disposed and oriented on their side edges along said partition.

References Cited in the file of this patent

UNITED STATES PATENTS 2,188,759     Redd _____ Jan. 30, 1940